Dec. 26, 1972 G. A. CHALFANT 3,707,591
HIGH SPEED MOLDING OF HOLLOW PLASTIC ARTICLES
Original Filed Dec. 15, 1969 3 Sheets-Sheet 1
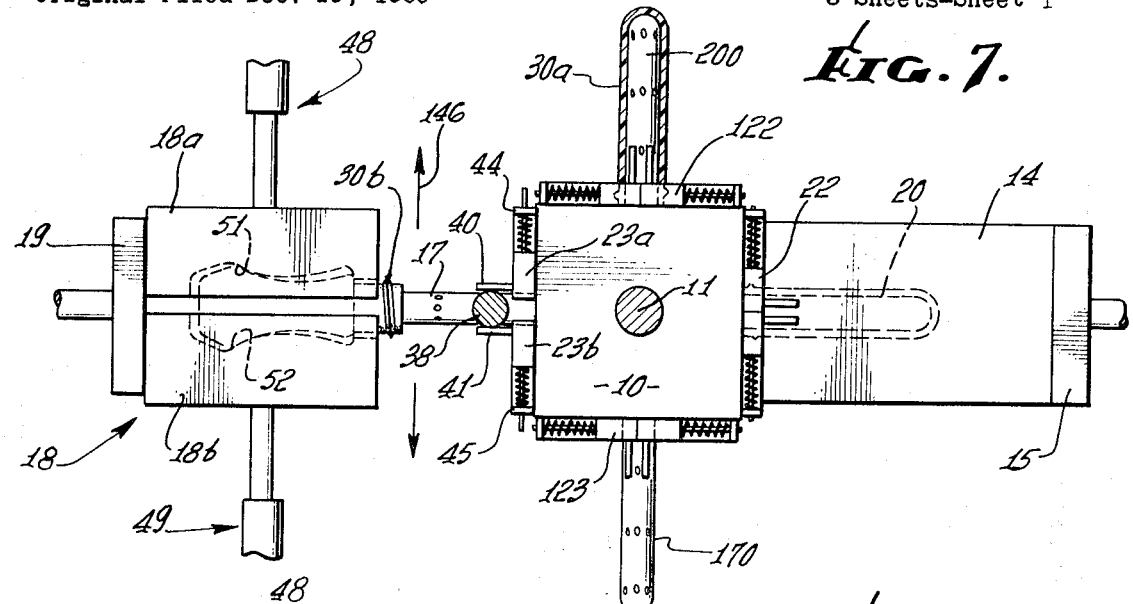
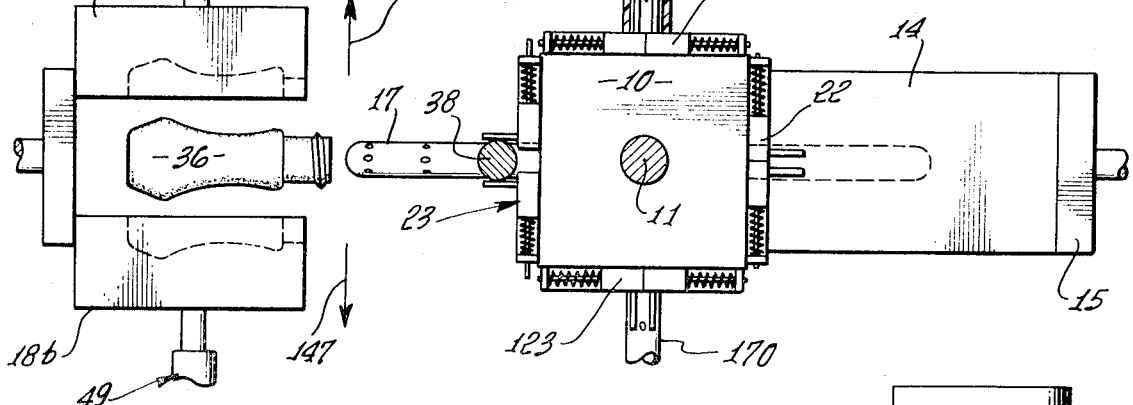
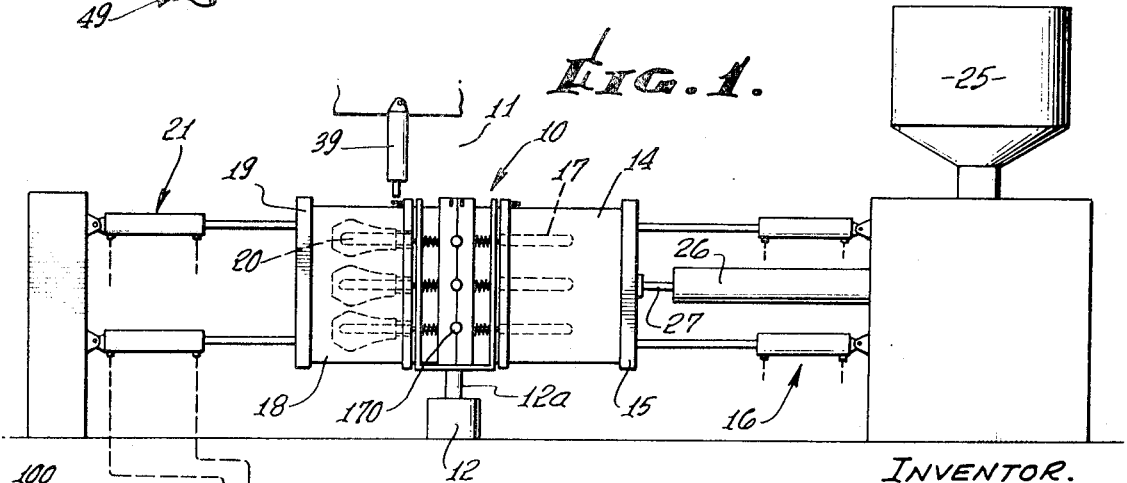
INVENTOR.
GEORGE A. CHALFANT
BY White & Haefliger
ATTORNEYS.

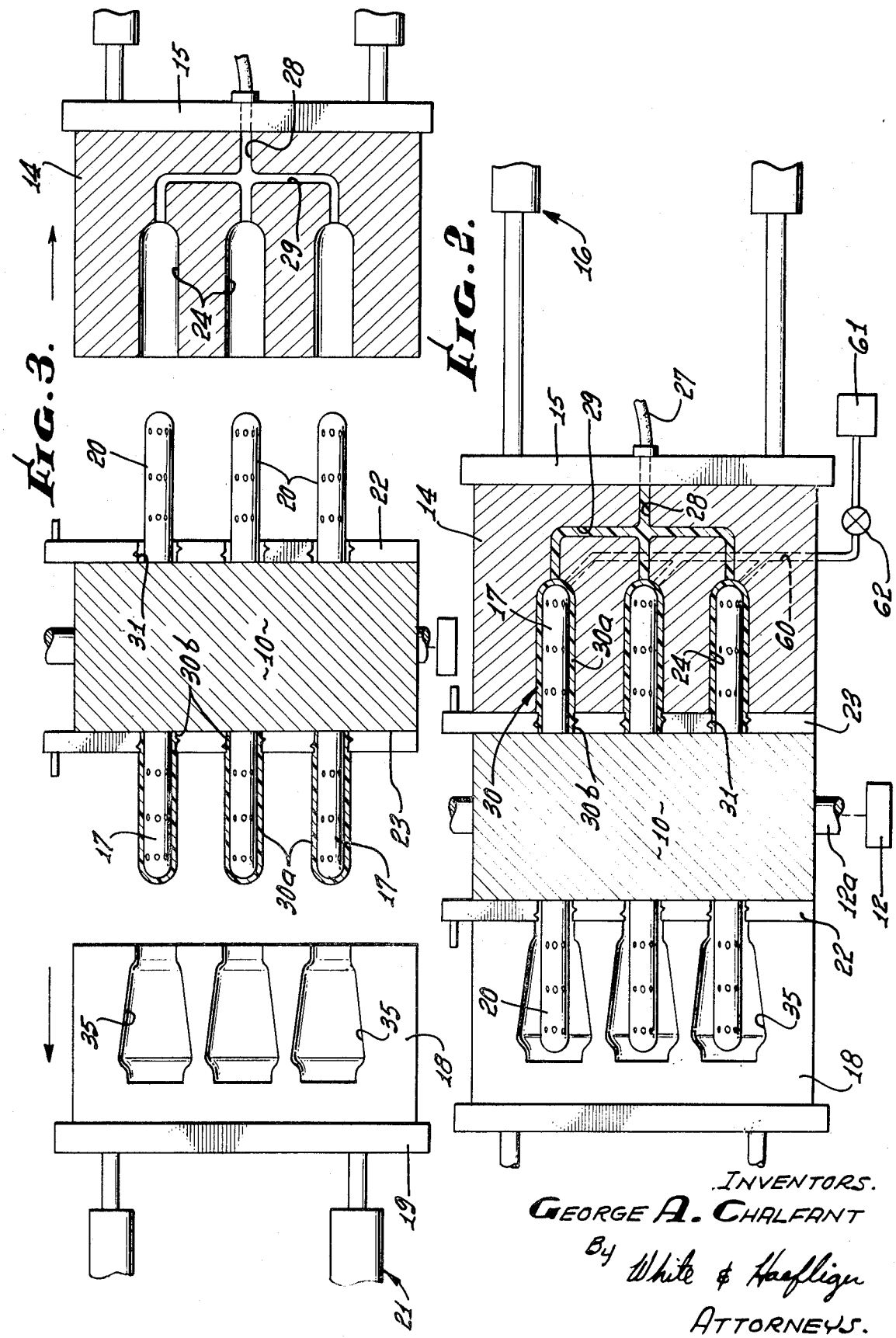

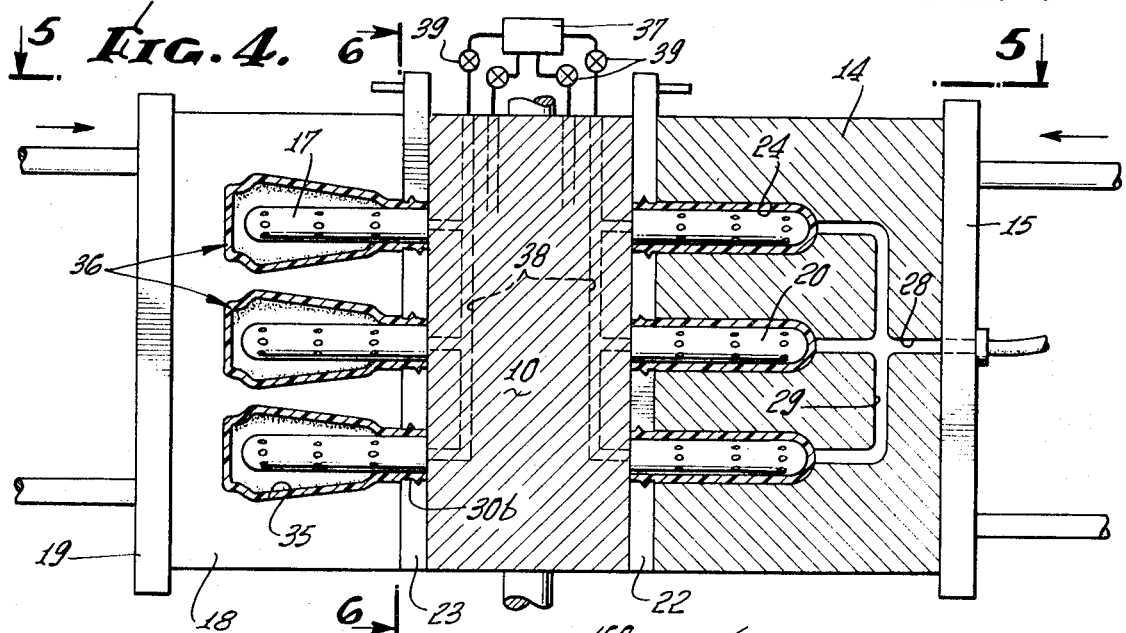
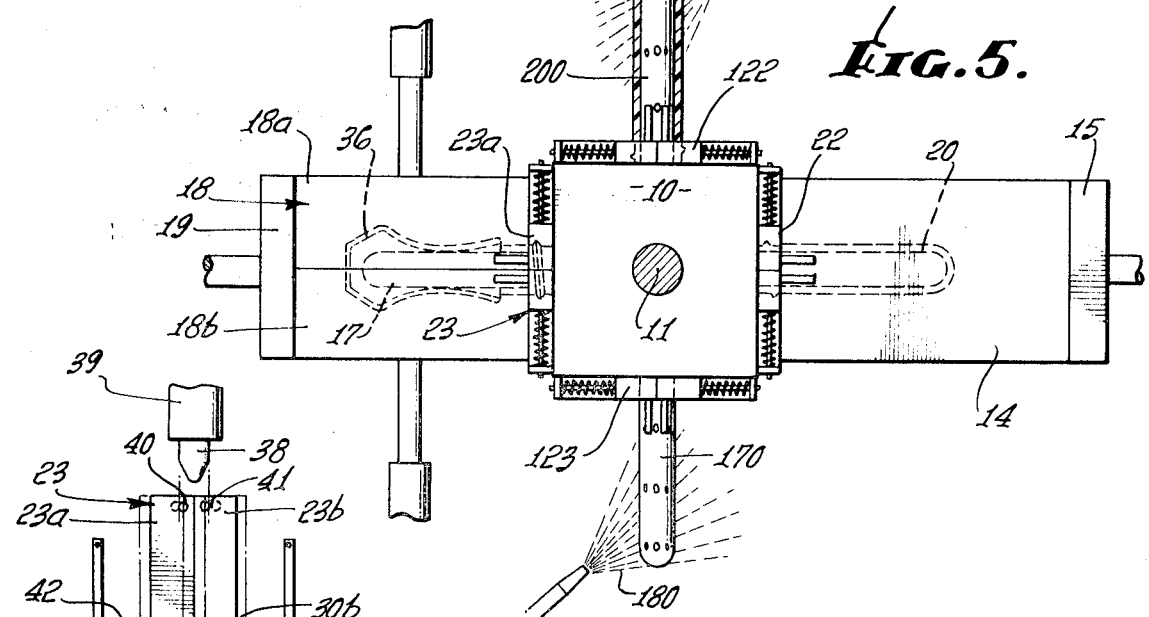
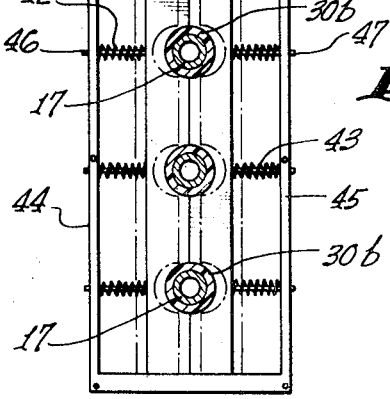

3,707,591
HIGH SPEED MOLDING OF HOLLOW PLASTIC ARTICLES
George A. Chalfant, Ontario, Calif., assignor to Trans Container Corporation, Los Angeles, Calif.
Continuation of abandoned application Ser. No. 885,076, Dec. 15, 1969. This application July 2, 1971, Ser. No. 159,487
Int. Cl. B29c *17/07, 25/00*
U.S. Cl. 264—97                                5 Claims

ABSTRACT OF THE DISCLOSURE

A plastic parison with neck and body portions is formed over a blow nozzle and within neck and body molds at a forming station. The parison and nozzle are transferred to a region outside the body forming mold and the hot body portion is cooled while the parison neck portion remains in a neck mold. Gas is next blown at a blow station and via the nozzle into the partially cooled parison body portion for effecting its expansion into container body shape within a blow mold, and the neck mold is then opened and the blown container is separated from the nozzle, as for example by the blow mold.

This application is a continuation of application Ser. No. 885,076, filed Dec. 15, 1969, and now abandoned.

BACKGROUND OF THE INVENTION

This invention relates generally to the art of blow molding, and more particularly concerns a method for blow molding containers at high production rates.

In the past, the blow molding of containers has included the steps of forming a plastic parison on a blow nozzle or pin, and thereafter blowing air or gas into the parison via the nozzle to expand the parison into a confining cavity to form the container or bottle. A problem arises when it is desired to blow-expand the parison at high temperature levels in that the resultant container is too soft unless excessive time is allowed for cooling prior to ejection from the blow mold. The problem is aggravated when it is desired to form a bottle with a neck, and particularly a threaded neck, when the latter is to be confined at the parison forming stage, subsequently transferred in confined state to the blowing station and later released to allow freeing of the bottle, desired very high production rates being unattainable due to temperature and handling constraints. In this regard, separation of the container or bottle from the mold cavity in which it is blown is a particular problem.

Prior efforts to solve these problems have resulted in such expedients as alllowing extra time for parison cooling; and providing a neck ring which was transferred from the parison forming station to the blowing station and then transferred to the blow mold itself for retraction with the container off the blow nozzle, followed by separation from the container. This procedure slows production and requires the use of neck ring retrieval means and added steps associated with recapture of the ring onto the nozzle or carriage therefor.

SUMMARY OF THE INVENTION

It is a major object of the invention to overcome the above mentioned problems and disadvantages, as well as others, through the provision of a method having an unusually effective mode of operation. Basically, the method of forming plastic containers using a blow nozzle and parison neck and body molds encompasses the steps that include forming a plastic parison in these molds to provide parison body and neck portions at temperatures proximate a first elevated temperature; effecting substantial cooling of the parison body portion outside the body mold to reduce the parison body temperature to predetermined lesser level, and while the neck portion is retained in the mold; thereafter blowing gas, at a blow station, via the nozzle into the cooled parison body portion for effecting expansion thereof into container body shape; and opening the neck mold relative to the parison neck portion and separating the blown container from the nozzle. As will be seen, the forming step may be carried out at a forming station, and the nozzle and parison may be rotated through a predetermined angle between the forming and blowing stations, the cooling step being carried out after the parison has left the forming station and prior to parison arrival at the blowing station. Also, such rotation may be interrupted for a predetermined time interval during which cooling is carried out. Accordingly, the parison temperature may be externally cooled to a desired level just above that which otherwise would prevent complete expansion of the parison to contained body shape, and below that which would otherwise introduce problems during blowing, (i.e. for example, too soft container ends after blowing) and at the same time production rates may be increased substantially without additional molds. In this regard, multiple nozzles may be employed and rotated between the mentioned stations so that parison forming, cooling and blowing steps may occur generally simultaneously and during the rotation interruption time interval, as referred to.

Additional important aspects of the method include interrupting parison rotation for cooling purposes after about 90 degrees rotation of the nozzle and parison from the forming station; effecting the blowing step after about 180 degrees rotation of the nozzle and parison from the forming station; further rotating the nozzle, from which the parison has been separated, through a predetermined angle between the blowing and forming stations and cooling the nozzle to a low temperature level prior to nozzle arrival or return of the nozzle to the forming station; effecting such nozzle cooling during the mentioned interruption interval, i.e. after about 90 degrees rotation from the blowing station; the employment of a turret carriage mounting the multiple nozzles and effecting nozzle rotation by rotating the turret carriage about a vertical axis; and the use of cool gas jets to cool the parisons and nozzles externally of the forming and blow molds.

In its apparatus aspects the invention concerns the provision of means for molding hollow plastic articles, and includes multiple blow nozzles and a rotating carriage therefor having successive rotary indexing positions; first means including a parison forming chamber located to receive a first blow nozzle and to effect formation of a plastic parison extending about that nozzle at a first elevated temperature and during carriage dwell at one indexing position; and other means including a blow molding chamber having a position in which it receives another nozzle with a previously formed parison thereon for blowing of gas via that nozzle into the parison body portion for effecting expansion thereof into article body shape at a reduced and second elevated temperature and during carriage dwell at that one indexing position; an intermediate one of the nozzles with formed parison thereon projecting, during that dwell, at a cooling location free of the chambers for parison cooling between the higher and lower elevated temperatures, and the multiple nozzles located so that upon carriage indexing the first nozzle with hot parison thereon will be rotated to the cooling location and the intermediate nozzle with partially cooled parison thereon will be rotated into position for reception by the blow molding chamber. In addition, a fourth of the nozzles may project during such dwell, at a cooling location free of the chambers for nozzle cooling to a temperature below the second elevated temperature, the fourth nozzle located so that upon carriage indexing it will be rotated into position for reception in the forming chamber. This configuration results in greatly enhanced production rates, without requiring added molds, since substantially cooling takes place outside the molds, reducing the blowing time otherwise required for article cooling after parison expansion in the blow mold.

As will be seen, means such as cooling air jets may be provided to effect cooling of the parisons and nozzles projecting free of the molds during dwell; and the carriage may have a vertical axis of rotation, with indexing position located at 90 degree intervals about the axis.

These and other objects and advantages of the invention, as well as the details of an illustrative embodiment, will be more fully explained in the following specification and drawings, in which:

DRAWING DESCRIPTION

FIG. 1 is a side elevational showing of one form of apparatus incorporating the invention;

FIG. 2 is an enlarged elevation, taken in section, showing details of the molds and carriage seen in FIG. 1;

FIG. 3 is a view like FIG. 2, but showing the molds in retracted position and the carriage rotated;

FIG. 4 is a view like FIG. 3, but showing the molds closed toward the rotated carriage;

FIG. 5 is a plan view taken on lines 5—5 of FIG. 4;

FIG. 6 is an elevation taken on lines 6—6 of FIG. 4;

FIG. 7 is a view like FIG. 5 showing the blow mold sections partly retracted and partly separated; and FIG. 8 is a view like FIG. 7 but showing the blow mold sections completely retracted and separated, the neck ring sections also being separated on the carriage.

DETAILED DESCRIPTION

Referring first to FIG. 1, the general organization illustrated includes a carriage 10 rotatable about a vertical axis 11 as by means of a drive 12 that includes an axle 12a. A suitably heated parison forming mold 14 is supported by platen 15 and horizontal actuator means 16 to be horizontally advanced toward the carriage to receive blow nozzles 17, and to be retracted away from the carriage to free the nozzles for rotary indexing with the carriage. A blow mold 18 is likewise supported by a platen 19 and horizontal actuator means 21 to be horizontally advanced toward the carriage to receive blow nozzles 20 (better seen in FIG. 2), and to be retracted away from the nozzles to free them for indexing. In addition, sets of nozzles are located at 170 and 200, whereby the sets 17, 170, 20 and 200 project outwardly from carriage 10 at 90 degree intervals about axis 11. Carriage rotation is interrupted after each 90 degrees of rotation of the carriage about axis 11, so that parison forming, cooling, blowing and nozzle cooling steps may be carried out simultaneously, as will appear, for rapid production rates. A controller for all the drives described and to be described is shown at 100, and may be automatic or hand-operated.

Turning to FIG. 2, the parison forming mold 14 is shown advanced relatively to the left to engage the neck ring 23 retained on the carriage 10. In this position, the nozzles or blow pins 17 project horizontally to the right into the forming cavities 24 in mold 14. Synthetic resinous thermoplastic material, as for example high density polyethylene, styrene or vinyl supplied via hopper 25 in FIG. 1, is extruded at 26 into the cavities 24 via line 27 and passages 28 and 29 in the mold. Plastic material is also extruded into the neck ring cavities 31, which may be threaded as shown, whereby the formed parison includes integral body and neck portions 30a and 30b. FIG. 2 also shows the blow molding chamber 18 advanced against the neck ring 22 at the left side of the carriage; however, parison blowing is not depicted in FIG. 2 since it represents start-up.

Following such parison formation, gas is blown into the parison body portions for effecting expansion thereof into container body shape, while maintaining the neck ring closed about the parison body portions. Prior to such blowing, however, the molds 14 and 18 may be relatively retracted horizontally away from the carriage, and the latter rotated approximately 180 degrees in two 90 degree steps about axis 11, as seen in FIG. 3, to bring the nozzles 17 opposite mold 18, and nozzles 20 opposite mold 14. In the meantime, the parisons are cooled to reduce their body temperatures to a predetermined lesser level substantially below parison forming temperature. For example, parison forming temperature may be between 360° F. and 400° F.; and the parisons may be cooled to between 260° F. and 300° F. after leaving the forming mold and prior to arrival at the blow mold. Their temperature at the blow mold is above, but less than about 20° F. above, the critical level at which a further reduction in temperature prevents complete expansion of the parison to container body shape. FIG. 5 illustrates such cooling effected by jetting of cool gas streams at 160 onto the heated parisons during interrupted rotation; however, sufficient cooling may occur during dwell, and without gas jetting.

It will be noted that the retention of the parison neck portions by closed neck ring 23 assures freeing of the formed parisons from forming mold cavities 24 during relative retraction thereof to FIG. 3 position. The molds 14 and 18 are shown in FIG. 4 as relatively advanced toward the rotated carriage to engage the neck rings 23 and 22, the nozzles 17 with formed parisons penetrating the blow mold cavities 35 and the nozzles 20 penetrating the forming mold cavities 24.

FIG. 4 also illustrates blowing of gas via the nozzles 17 and into the parison body portions to effect their expansion into container body configuration, as designated at 36. Gas may be supplied to all the nozzles, as from a source 37 and passages 38 in the carriage 10 to which the nozzles remain mounted. Valves 39 are alternately operable to control gas flow to those nozzles at the blow mold. It will be noted that the neck ring 23 remains closed about the parison necks 30b during such blowing. During closure of the molds 14 and 18 against the neck rings 23 and 22, plastic may be extruded into cavities 24 in mold 14 to form parisons about nozzles 20, as also seen in FIG. 4, and as described above in connection with FIG. 2. Also, the number of parisons and mold cavities may be multiplied. Therefore, with such doubling-up of the operations, together with 90 degree incremental rotation, a very high rate of blown container production may be achieved with a minimum number of stations, molds and part movements. For example, without intermediate cooling during a short dwell time, as for example about 4 to 6 seconds, the hot parisons would be transferred directly to the blow mold and require excessive blowing time (say around 10 seconds) to cool the blown containers from around 380° to around 180° F. Now, they need only be cooled in the blow mold from around 280° F. to around 180° F., requiring only about 4 to 6 seconds dwell in the blow mold, for example. Also contributing to high rate production is the simplified mode of blown container release, as will be described below. FIG. 5 also illustrates the step of cooling the nozzle after it has left the blowing station and prior to its arrival at the forming station. Cooling air may be jetted at 180 against the nozzle 170 during the short dwell required for parison formation and container blowing, cooling the nozzle to 70° to 80° F.

As will appear, the method of container release includes the step of opening the neck ring relative to the parison neck portion, and removing the blown container from the nozzle while retaining the neck ring in predetermied association with the nozzle or carriage. The removal step is typically accomplished in response to relative separation of the blow mold chamber and nozzle; and advantage may be taken of the forces and relationships created during such removal to loosen the blown container from the blow mold as by at least partially separating blow mold sections during mold retraction.

In the example, the apparatus and steps shown in FIGS. 5-8 represent one illustration of such simplified and unusually advantageous release. The neck ring 23 is illustrated to include opposed sections 23a and 23b in FIG. 6 which are subject to retraction (opening) in opposite horizontal directions to broken line positions as indicated, thereby to free the neck portions 30b of the parisons for withdrawal off the nozzles 17. Such retraction may, for example, be effected in response to downward stroking of a cam pin 38 by actuator 39, for spreading apart the lugs 40 and 41 integral with the respective sections 23a and 23b. Resistance to such retraction of the sections is provided by compression springs 42 and 43 located between the respective sections and fixed back-up structure 44 and 45 on the carriage. If desired, guide rods 46 and 47 may be provided on the sections and to fit in the openings in structure 44 and 45, to guide the sections horizontally between closed position as seen in FIG. 5, and open or retracted position as seen in FIGS. 7 and 8. Accordingly, means is provided for at least partially separating the neck ring sections while the latter remain on the carriage and prior to relative separation of the blown container from the nozzle. FIG. 6 illustrates the neck ring separation (broken lines) prior to initial retraction of the containers relative to the nozzle; FIG. 7 shows partial retraction of the container off the nozzle; and FIG. 8 illustrates complete retraction of the container off the nozzle, the retraction direction being horizontal.

The blow mold 18 includes sections 18a and 18b which are themselves separated horizontally in arrow directions 146 and 147 as seen in FIGS. 7 and 8 to free the retracted bottle or container 36 to fall downward into a collection zone, not shown. Suitable actuators to effect such separation are indicated at 48 and 49. In this regard, initial separation of the mold sections 18a and 18b may be effected during retraction of the mold 18 relative to the nozzle, whereby the container which is centered on the nozzle (via the neck portion 30b) during such retraction with the mold is loosened from the mold sections. At the same time, the mold sections, though partly separated, continue to retract the container relative to the nozzle, as by engagement of cavity shoulders with the container, as for example is seen at 51 and 52 in FIG. 7. As a result, the container is assured of complete separation from the mold sections when displaced off the nozzle 17, as for example is indicated in FIG. 8.

Following such retraction and falling of the container out of the mold area, the carriage is rotated 90 degrees and the sections 18a and 18b are closed together and advanced, or vice versa, to the position seen in FIG. 4 for blowing of the next set of parisons to bottle configuration.

Referring back to FIG. 2, a method is shown of aiding the release of the formed parison bodies 30 from the mold cavities 24, if such aid is ever needed. As illustrated, pressurized gas from a source 61 is led via a control valve 62 to a passage 60 in the mold terminating at the mold cavities, as for example near the parison tips. At the time of parison withdrawal, the gas pressure tends to drive the parisons from the mold cavities. No lengthwise flash is produced due to endwise withdrawal.

FIGS. 5, 7 and 8 also show neck ring sections 122 associated with nozzles 200, and neck ring sections 123 associated with nozzles 170.

I claim:

1. In the method of rapidly forming plastic containers using a blow nozzle and parison neck and body molds, the steps that include,
   (a) injection forming a plastic parison from a synthetic resinous thermoplastic material in said molds and about said nozzle at a forming station to provide parison body and neck portions at temperatures proximate a first elevated temperature, and thereafter effecting relative endwise retraction of the parison from said body mold while both the body and the neck molds remain closed,
   (b) effecting substantial external cooling of the main extent of said parison body portion firmly supported on said nozzle at a cooling region outside the body mold to reduce the parison body temperature to predetermined lesser level, and while the neck portion is retained in the neck mold,
   (c) thereafter blowing gas, at a blow station, via the nozzle into the cooled parison body portion for effecting expansion thereof into container body shape, and
   (d) subsequently opening the neck mold relative to the parison neck portion and separating the blown container from the nozzle,
   (e) said external cooling being carried out while the parison dwells in the open at said cooling region and while another parison is being formed in said molds and while still another cooled parison is being subjected to expansion at the blow station,
   (f) the parison body temperature being reduced at said cooling region from between about 360° to 400° F. to between about 260° to 300° F.,
   (g) said lesser temperature level being above, but less than about 20° F. above, that critical level at which a further reduction in temperature prevents complete expansion of the parison to container body shape,
   (h) the nozzle and parison thereon being rotated through an angle of about 180 degrees between said forming and said blowing stations, said rotation being interrupted for a short time interval after about 90 degrees rotation from said forming station for said cooling, and
   (i) there being a rotary turret carriage mounting the nozzle and neck mold, the neck mold releasing the parison after blowing of the parison, and including the step of retaining the neck mold on the carriage throughout said blowing and releasing of the parison.

2. The method of claim 1 wherein said interval is less than about six seconds.

3. The method of claim 1 including the further steps of rotating the nozzle from which the parison has been separated through a predetermined angle of about 90 degrees from the blowing station, and cooling the nozzle during interruption of such rotation so that the nozzle temperature is reduced to between 60° and 90° F.

4. The method of claim 1 wherein said cooling is effected by externally jetting cooling air against the parison body portion.

5. The method of claim 3 wherein said nozzle cooling is effected by externally jetting cooling air against the nozzle.

(References on following page)

References Cited

UNITED STATES PATENTS

| | | | |
|---|---|---|---|
| 2,853,736 | 9/1958 | Gussoni. | |
| 3,125,619 | 3/1964 | Miller | 264—98 |
| 3,116,516 | 1/1964 | Moslo | 18—5 |
| 3,294,883 | 12/1966 | Polka | 264—97 |
| 3,349,155 | 10/1967 | Valyi | 264—97 |
| 3,364,520 | 1/1968 | Hestehave | 264—97 UX |
| 3,480,993 | 12/1969 | Schjedahl et al. | 264—97 X |
| 3,609,803 | 10/1971 | Fattori. | |
| 3,616,491 | 11/1971 | Vollers. | |

FOREIGN PATENTS

| | | | |
|---|---|---|---|
| 1,183,255 | 7/1959 | France | 18—5 |

ROBERT F. WHITE, Primary Examiner

J. H. SILBAUGH, Assistant Examiner

U.S. Cl. X.R.

425—242, 324